(12) United States Patent
Takezawa et al.

(10) Patent No.: US 10,274,118 B2
(45) Date of Patent: Apr. 30, 2019

(54) PIPE JOINT HAVING RELEASABLY ENGAGEABLE PLUG AND SOCKET

(71) Applicant: Tatsuno Corporation, Tokyo (JP)

(72) Inventors: Masahiro Takezawa, Tokyo (JP); Yuki Terasoma, Tokyo (JP); Kiyoshi Kimura, Tokyo (JP)

(73) Assignee: Tatsuno Corporation, Tokyo (JP)

( * ) Notice: Subject to any disclaimer, the term of this patent is extended or adjusted under 35 U.S.C. 154(b) by 0 days.

(21) Appl. No.: 15/832,426

(22) Filed: Dec. 5, 2017

(65) Prior Publication Data

US 2018/0172191 A1    Jun. 21, 2018

(51) Int. Cl.
| | |
|---|---|
| *F16L 29/04* | (2006.01) |
| *F16L 37/23* | (2006.01) |
| *F16L 37/35* | (2006.01) |
| *F16L 55/10* | (2006.01) |
| *F16L 27/06* | (2006.01) |
| *F17C 13/00* | (2006.01) |

(52) U.S. Cl.
CPC .............. *F16L 29/04* (2013.01); *F16L 27/06* (2013.01); *F16L 37/23* (2013.01); *F16L 37/35* (2013.01); *F16L 55/1015* (2013.01); *F17C 13/00* (2013.01); *F17C 2205/037* (2013.01); *F17C 2250/0478* (2013.01)

(58) Field of Classification Search
CPC . F16L 37/30; F16L 29/04; F16L 37/35; F16L 55/1015
USPC ....................................... 137/614.03–614.05
See application file for complete search history.

(56) References Cited

U.S. PATENT DOCUMENTS

| | | | |
|---|---|---|---|
| 2004/0074541 | A1 | 4/2004 | Sharpe |
| 2010/0319690 | A1* | 12/2010 | Cuzydlo ............. A61M 16/183 128/203.12 |
| 2013/0333767 | A1 | 12/2013 | Schmidt |

FOREIGN PATENT DOCUMENTS

JP        2007120717        5/2007

OTHER PUBLICATIONS

Extended European Search Report for EP17202497.8; dated Apr. 18, 2018.

* cited by examiner

*Primary Examiner* — Kevin L Lee
(74) *Attorney, Agent, or Firm* — Stetina Brunda Garred and Brucker; Mark B. Garred

(57) ABSTRACT

To provide a pipe joint for emergency releasing with a minimized seal structure to minimize leakage risk. Pipe joints (100, 101: pipe joints for emergency releasing) of the present invention include a cylindrical plug (10) in which a passage (1A: in-plug passage) is formed, a cylindrical socket (20) in which a passage (21A: in-socket passage) is formed, and shutoff valves (5, 24) mounted in the plug (10) and the socket (20) for opening the passages (1A, 21A) of the plug (10) and the socket (20) when the plug (10) is inserted into the socket (20) and shutting the passages (1A, 21A) of the plug (10) and the socket (20) when the plug (10) detached from the socket (20), wherein central axes of the passages (1A, 21A) of the plug (10) and the socket (20) do not form a straight line.

17 Claims, 11 Drawing Sheets

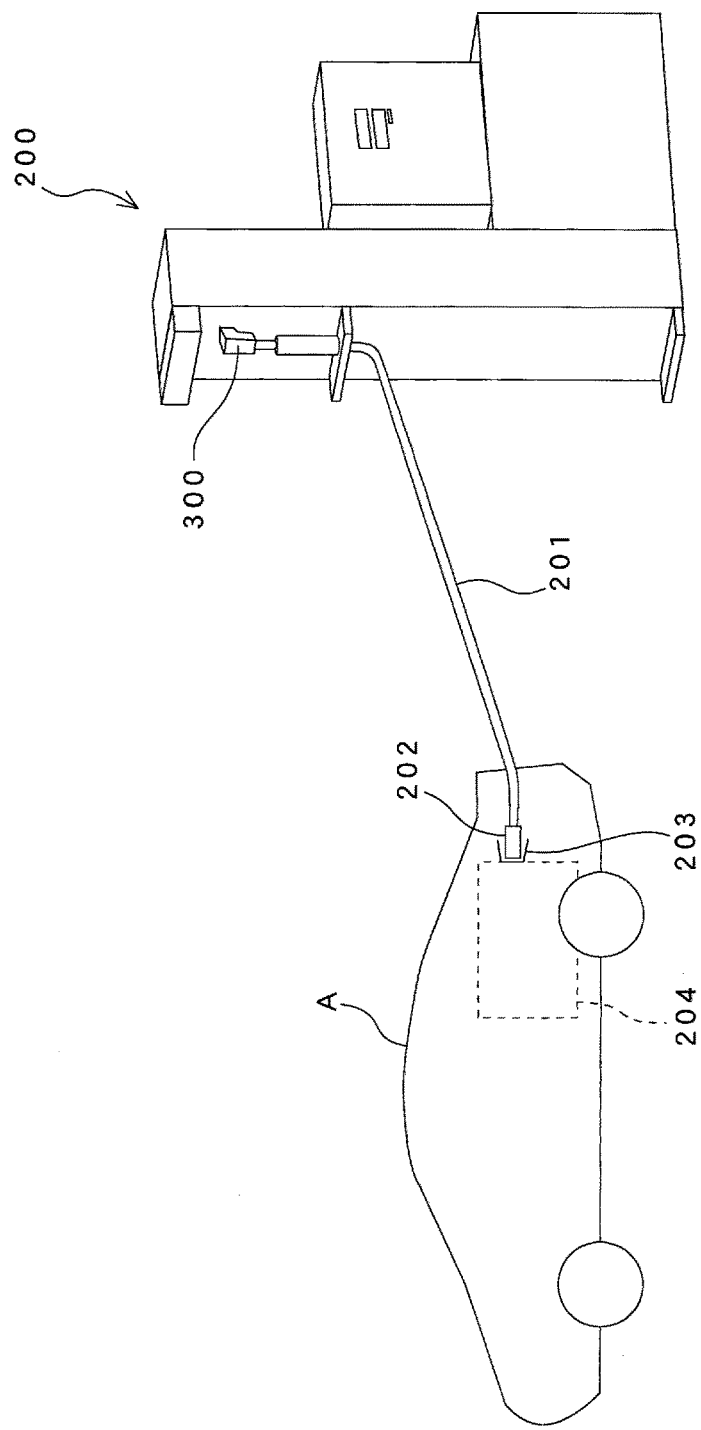
[Fig. 9]

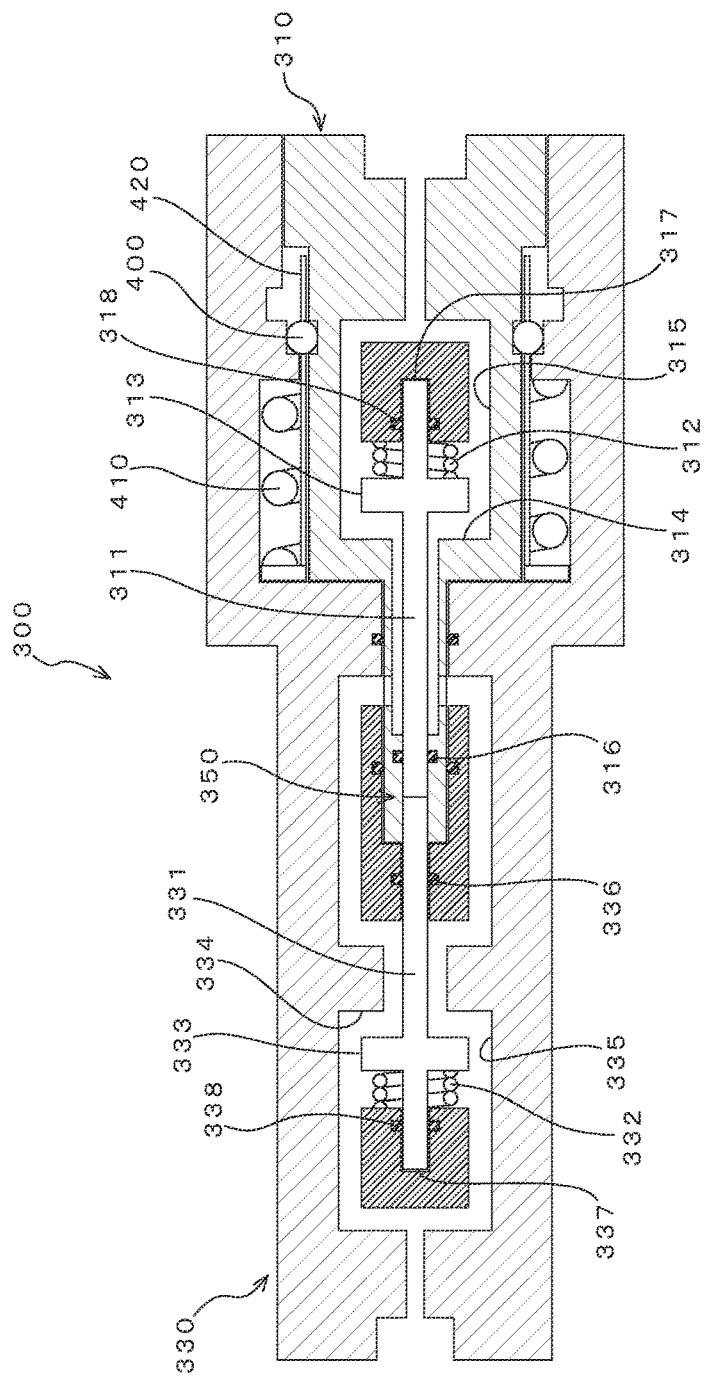
[Fig. 10]

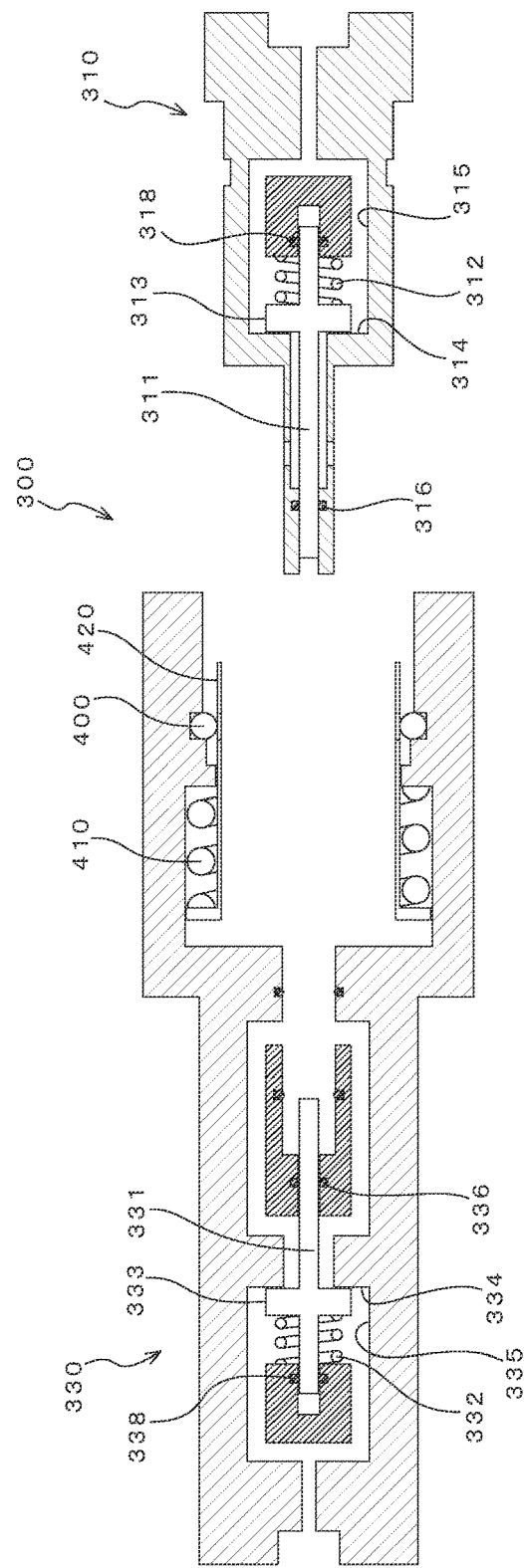

PIPE JOINT HAVING RELEASABLY ENGAGEABLE PLUG AND SOCKET

CROSS-REFERENCE TO RELATED APPLICATIONS

The present application claims priority to Japanese Patent Application No. 2016-240235 filed on Dec. 12, 2016, the disclosure of which is incorporated herein by reference.

STATEMENT RE: FEDERALLY SPONSORED RESEARCH/DEVELOPMENT

Not Applicable

BACKGROUND

1. Field of the Invention

The present invention relates to a filling apparatus for filling gas such as hydrogen gas used as fuel. More particularly, the present invention relates to a pipe joint for separating a filling hose and the filling apparatus from each other in an emergency.

2. Description of the Related Art

For example, to a vehicle A using hydrogen as fuel, as show in FIG. 9, at a hydrogen filling station is filled hydrogen gas after a filling nozzle 202 mounted on an end of a filling hose 201 and a vehicle side filling port 203 are connected with each other. The filling is performed while being controlled depending on the maximum using pressure of a hydrogen tank 204 mounted in the vehicle A. Here, when the vehicle A runs to pull the filling hose 201 while hydrogen gas is filled, parts such as the filling nozzle 202 and the filling hose 201 are broken to inject a hydrogen gas, so that it becomes a dangerous condition. Then, a pipe joint 300 for emergency releasing is mounted between a hydrogen filling apparatus 200 and the filling hose 201, and when to the filling hose 201 is applied a tensile force more than a predetermined value, the pipe joint 300 for emergency releasing separates to prevent the parts such as the filling nozzle 202 and the filling hose 201 from being broken. As shown in FIGS. 10 and 11, the pipe joint 300 for emergency releasing is constituted such that center axes of a socket 330 (communicating with a hydrogen filling apparatus) and a plug 310 (communicating with a vehicle) form a straight line so as to easily separate when to the filling hose 201 is applied an excessive tensile force.

FIGS. 10 and 11 show the pipe joint 300 for emergency releasing according to a conventional technique. The pipe joint 300 switches connection/disconnection of the socket 330 and the plug 310 by a mechanism having a spring holder 420 with connecting balls 400 and a connecting spring 410. As shown in FIG. 10, in the pipe joint 300 that is not under operation, a socket side pin 331 and a plug side pin 311 form a straight line under a condition that end portions (pin connecting end portions 350) thereof contact with each other and press with each other. Then, the socket side pin 331 is pressed by the plug side pin 311 to move left side in FIG. 10 against an elastically repulsive force of a socket side spring 332. As a result, a socket side valve element 333 becomes separated from a socket side valve seat 334. On the other hand, the plug side pin 311 is pressed by the socket side pin 331 to move right side in FIG. 10 against an elastically repulsive force of a plug side spring 312. As a result, a plug side valve element 313 becomes separated from a plug side valve seat 314.

When to the filling hose is applied an excessive tensile force more than a predetermined value due a trouble such that a vehicle starts while hydrogen gas is filled, as shown in FIG. 11, the socket 330 and the plug 310 become separated from each other (at operation). FIG. 11 shows a condition that the socket 330 and the plug 310 are separated from each other and they are not pressed each other. Then, by the elastically repulsive force of the socket side spring 332 moves the socket side pin 331 right in FIG. 11, and the socket side valve element 333 seats on the socket side valve seat 334 to shut an in-socket passage 335. On the other hand, by the elastically repulsive force of the plug side spring 312 moves the plug side pin 311 left in FIG. 11, and the plug side valve element 313 seats on the plug side valve seat 314 to shut an in-plug passage 315. As a result, under a condition that the socket 330 and the plug 310 are separated from each other, it is prevented that a high pressure hydrogen gas is discharged out of the socket 330 or the plug 310.

In the pipe joint 300 for emergency releasing shown in FIGS. 10 and 11, portions of the socket side pin 331 and the plug side pin 311 position in the in-socket passage 335 and the in-plug passage 315 respectively. Then, in order to prevent hydrogen gas from leaking, seal materials 336, 316 (O-rings) are mounted. The seal materials make a pressure at a place where the end portions 350 of the socket side pin 331 and the plug side pin 311 contact with each other the same as atmospheric pressure even when high pressure hydrogen gas is filled.

Here, when a high pressure hydrogen gas is filled, in order to prevent another end portion 337 of the socket side pin 331 and another end portion 317 of the plug side pin 311 from being high pressure due to going around of hydrogen gases to the portions 337, 317, seal materials 338, 318 (O-rings for instance) are mounted. When the socket side pin another end portion 337 and the plug side pin another end portion 317 become high pressure without the seal materials 338, 318, forces that both end portions 350 of the socket side pin 331 and the plug side pin 311 press with each other increase to exceed a predetermined value of the pipe joint 300 for emergency releasing, which causes the socket 330 and the plug 310 to separate from each other. In addition, the direction of the forces that both end portions 350 of the socket side pin 331 and the plug side pin 311 press with each other is matched with the direction that the socket 330 and the plug 310 separate from each other in the pipe joint 300 for emergency releasing, so that there is a possibility that the separated socket 330 and the plug 310 are blown off.

As described above, it is essential for the conventional pipe joint 300 for emergency releasing shown in FIGS. 10 and 11 that the seal materials 336, 316, 338 and 318. But, there is a problem that mounting these seal materials 336, 316, 338 and 318 makes structure of the pipe joint 300 complicated to increase the number of parts. Then, when the above seal materials 336, 316, 338 and 318 deteriorate due to repeated connections/disconnections of the socket 330 and the plug 310, there is a risk that a high pressure hydrogen gas leaks. As a result, without an excessive tensile force to the filling hose, there is a possibility that the socket 330 and the plug 310 separate from each other.

Pipe joints for emergency releasing are proposed other than those shown in FIGS. 10 and 11 (Japanese patent publication 2007-120717 gazette, for example). But, in the conventional technique, a coupling 11 for emergency releasing and a filling apparatus 1 are connected through a hose 4A with each other, and both end portions of the hose 4A become connecting portions, so that this conventional technique has a problem that the number of connecting portions increases to make leakage risk high. In addition, at the emergency releasing, a moving pin 35 in a joint member 29 on an outflow side moves relative to a seal ring 30B, and the seal ring 30B damages, or the moving pin 35 engages with the seal ring 30B, so that there is an inconvenient condition that leakage risk of hydrogen gas from the seal ring 30B increases.

SUMMARY

The present invention has been made in consideration of the above problems in the prior art, and the object thereof is to provide a pipe joint for emergency releasing with a minimized seal structure to minimize leakage risk.

Pipe joints (100, 101: pipe joints for emergency releasing) of the present invention include: a cylindrical plug (10) in which a passage (1A: in-plug passage) is formed; a cylindrical socket (20) in which a passage (21A: in-socket passage) is formed; and shutoff valves (5, 24) mounted in the plug (10) and the socket (20) for opening the passages (1A, 21A) of the plug (10) and the socket (20) when the plug (10) is inserted into the socket (20) and shutting the passages (1A, 21A) of the plug (10) and the socket (20) when the plug (10) is detached from the socket (20), wherein central axes of the passages (1A, 21A) of the plug (10) and the socket (20) do not form a straight line (for example, the passages (1A, 21A) intersect perpendicularly).

In addition, in the present invention, it is preferable that the connecting members (40) release connection between the plug (10) and the socket (20) when an external force more than predetermined value is applied to the plug (10) and the socket (20) in a direction that the plug (10) and the socket (20) are separated from each other.

In the present invention, it is preferable that on one end of a socket side valve rod (22) with at least one opening (22A) is mounted (a valve element 25 of) a socket side shutoff valve (24) against an elastic body (23: socket side spring), and another end of the socket side valve rod (22) contacts a case (3) for accommodating a plug side valve rod (2) of a plug (10).

Or, in the present invention, it is preferable that on one end of a plug side valve rod (2) is mounted (a valve element 6 of) a plug side shutoff valve (5) against an elastic body (4: plug side spring), and another end is locked by at least one locking member (7: locking balls) to open the plug side shutoff valve (5).

With the pipe joints (100, 101) with the above construction, since central axes of the passages (1A, 21A) of the plug (10) and the socket (20) do not form a straight line (for example, the central axes are orthogonal), central axes of the valve rod (2) of the plug (10) and the valve rod (22) of the socket (20) do not form a straight line also, and both end portions of the valve rod (2) of the plug (10) and the valve rod (22) of the socket (20) are not contacted with each other in a straight line, and the both end portions are not pressed with each other. Therefore, even when high pressure hydrogen gas is fed, forces that both end portions of the valve rods (22, 2) are pressed with each other do not increase, and the socket (20) and the plug (10) are not separated from each other. Then, the both end portions of the rods (22, 2) are not pressed with each other, separating directions of the socket (20) and the plug (10) are not aligned with each other, so that the separated socket (20) and plug (10) are not blown off. Further, the pipe joints (100, 101) can be decreased in size and weight. In addition, handleability of the filling hose at filling of high pressure hydrogen gas improves, for instance.

In the present invention, when the plug (10) and the socket (20) are connected with each other by connecting members (40) arranged in a radial direction of the plug (10), a condition that the plug (10) and the socket (20) are connected with each other is surely maintained.

In addition, in the present invention, when the connecting members (40) release connection between the plug (10) and the socket (20) when an external force more than a predetermined value is applied to the plug (10) and the socket (20) in a direction that the plug (10) and the socket (20) are separated from each other, regardless of pressures in the passages of the plug (10) and the socket (20), by only an external force (a tensile force applied to a filling hose in case that a vehicle moves at filling, for instance) are separated the plug (10) and the socket (20) from each other.

In the present invention, when on one end of a socket side valve rod (22) with at least one opening (22A) is mounted (a valve element 25 of) a socket side shutoff valve (24) against an elastic body (23: socket side spring), and another end of the socket side valve rod (22) contacts a case (3) for accommodating a plug side valve rod (2) of a plug (10), when the plug (10) and the socket (20) are separated from each other, it is prevented that a high pressure hydrogen gas leaks from a side that the socket (20) is connected through the socket side shutoff valve (24) (basically apparatus side, possibly vehicle side).

Or, in the present invention, when on one end of a plug side valve rod (2) is mounted (a valve element 6 of) a plug side shutoff valve (5) against an elastic body (4: plug side spring), and another end is locked by at least one locking member (7: locking ball) to open the plug side shutoff valve (5), when the plug (10) and the socket (20) are separated from each other, it is prevented that a high pressure hydrogen gas leaks from a side that the plug (10) is connected through the shutoff valve (5) (basically vehicle side, possibly filling apparatus side).

BRIEF DESCRIPTION OF THE DRAWINGS

FIG. 9 is a brock diagram showing outline of a hydrogen filling station;

FIG. 10 is an explanatory cross sectional view showing a condition that a plug and a socket are connected with each other in a conventional pipe joint for emergency releasing; and FIG. 11 is an explanatory cross sectional view showing a condition that the plug and the socket are separated from each other in the pipe joint shown in FIG. 10.

DETAILED DESCRIPTION

Figure 1:
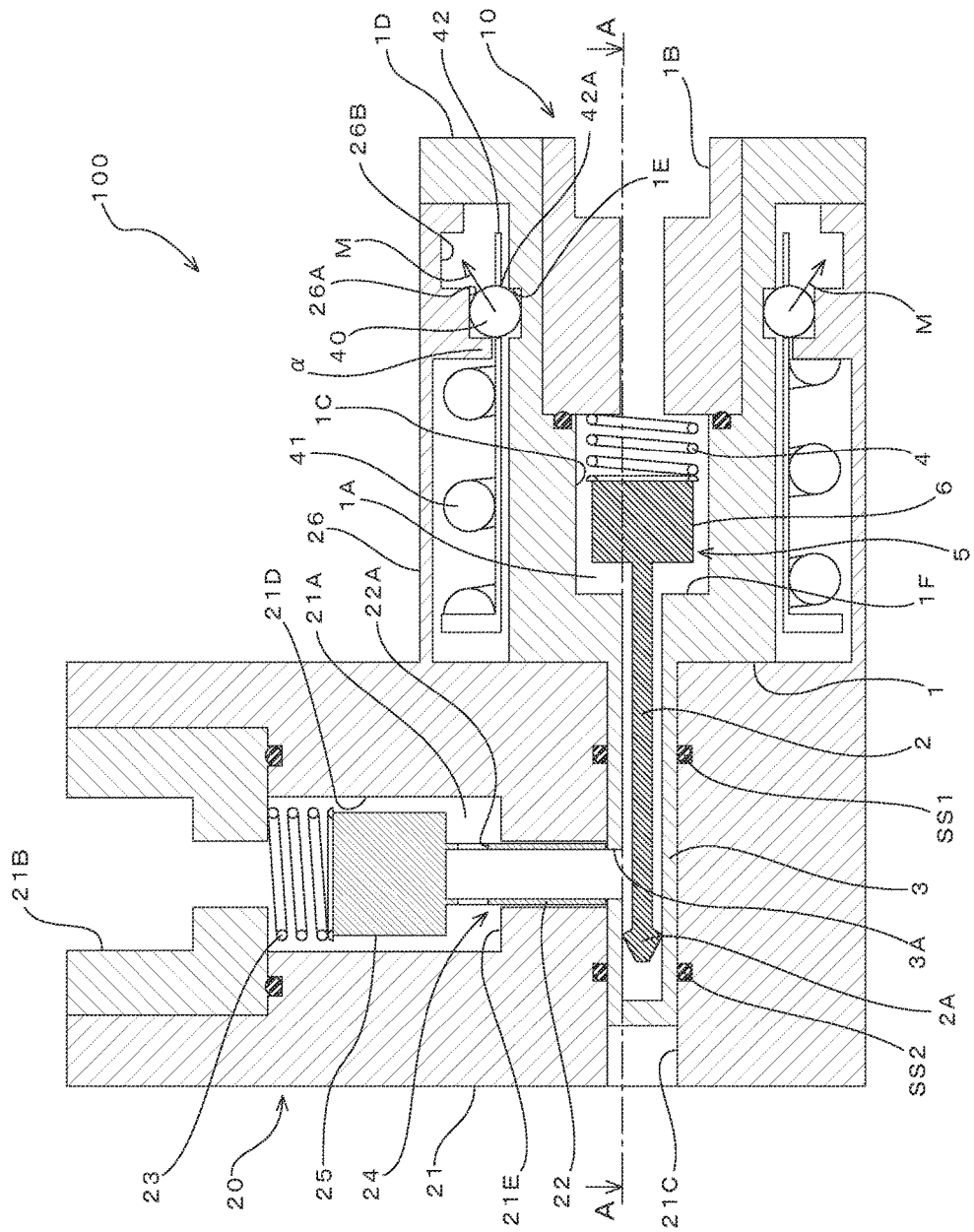
FIG. 1 is an explanatory cross sectional view showing a condition that a plug and a socket are connected with each other in the first embodiment according to the present invention.
Figure 2:
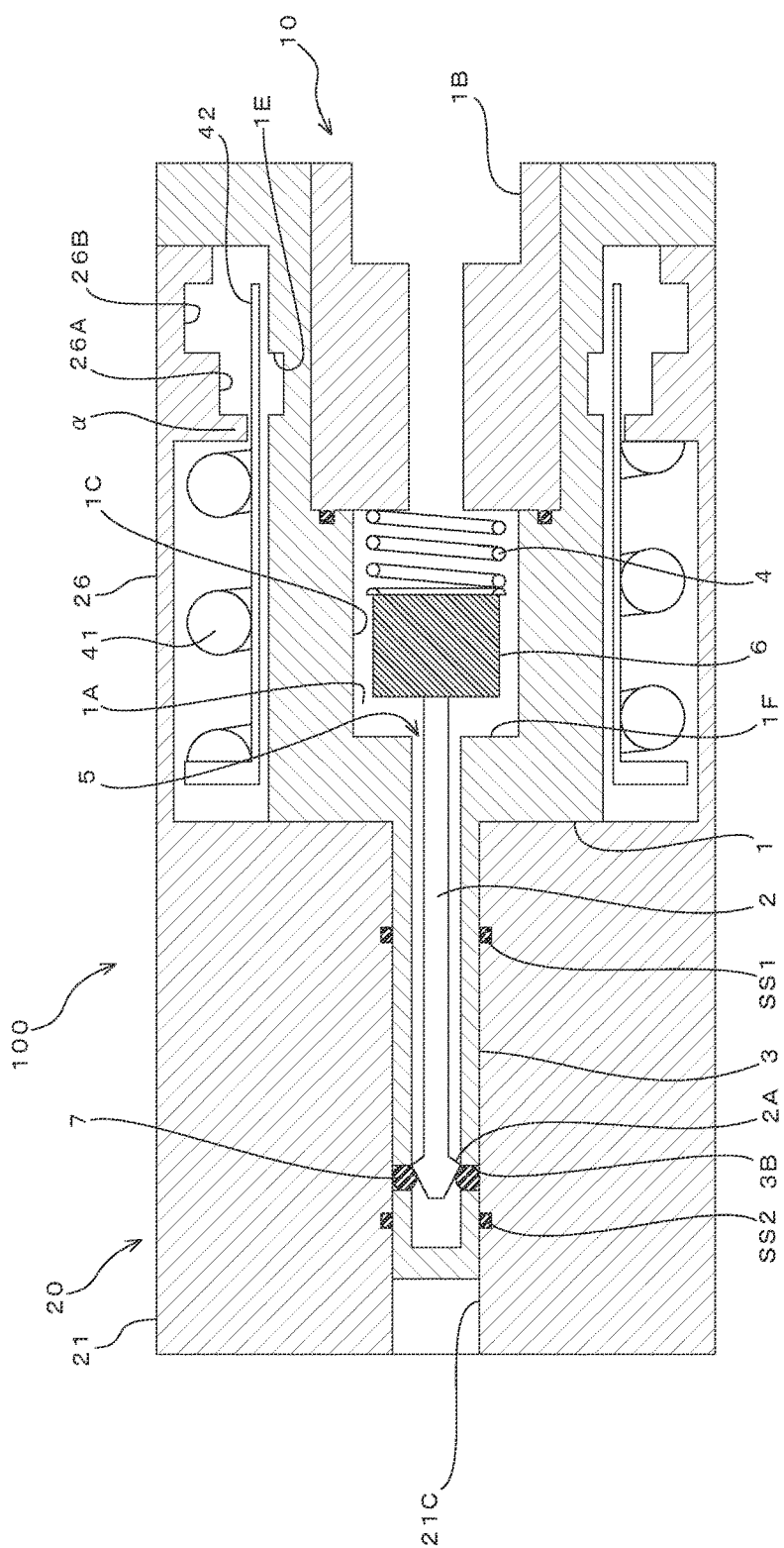
FIG. 2 is a cross sectional view taken along the A-A line in FIG. 1.

Hereinafter, embodiments of the present invention will be explained with reference to the attached drawings. At first, the first embodiment of the present invention will be explained with reference to FIGS. 1 to 4. A pipe joint 100 (pipe joint for emergency releasing) includes a plug 10 and a socket 20. FIGS. 1 and 2 show a condition that the plug 10 and the socket 20 are connected with each other. Here, the plug 10 is basically arranged on a vehicle side, and the socket 20 is basically connected on a hydrogen filling apparatus (or a dispenser) side. Meanwhile, it is possible to arrange the plug 10 on a hydrogen filling apparatus (or a dispenser) side and to arrange the socket 20 on a vehicle side.

In FIG. 1, the plug 10 shaped like a cylinder as a whole body includes a plug main body 1 and a plug side rod case 3. To a central portion (a vertically central portion at a right end of the plug main body 1 in FIG. 1) on the vehicle side (right side in FIG. 1, a side apart from the socket 20 side) end portion of the plug main body 1 is mounted a hydrogen gas supply port 1B connected to a filling hose (not shown). At a vertically central portion of the plug main body 1 is formed an in-plug passage 1A, which extends in a horizontal direction in FIG. 1. On the in-plug passage 1A is formed a plug side valve element accommodating portion 1C. The in-plug passage 1A extends from a passage in the plug side rod case 3 through a passage in the plug side valve element accommodating portion 1C to the hydrogen gas supply port 1B.

In the in-plug passage 1A is accommodated a plug side rod 2. On an end portion on the side separated from the socket 20 of the plug side rod 2 (right side in FIG. 1) is mounted a plug side valve element 6, which is accommodated in the valve element case 1C. In the valve element case 1C, on a vehicle side (side apart from the socket 20: right side in FIG. 1) of the plug side valve element 6 is arranged a plug side spring 4 (an elastic material), which energizes the plug side valve element 6 toward the socket 20 side (left side in FIG. 1). The plug side valve element 6 and a valve seat 1F configure a plug side shutoff valve 5, and the valve seat 1F is formed by a step portion of the valve element case 1C. Then, the plug side shutoff valve 5 has a function of shutting/opening the plug side passage 1A. On the plug side rod 2, an end portion on the opposite side (left side in FIG. 1) of the valve element 6 configures a locking portion 2A. An end portion (on the left side in FIG. 1) of the locking portion 2A has a diameter smaller than that of the rod 2, and a diameter of the locking portion 2A gradually increases toward the valve element 6 (right side in FIG. 1) from the end portion, and a portion near the end portion on the valve element 6 side (right side in FIG. 1) of the locking portion 2A has a diameter larger than the rod 2.

In FIG. 1, on the outside in a radial direction of the hydrogen gas supply port 1B mounted on a vehicle side end portion (right side in FIG. 1) of the plug main body 1 is mounted a flange portion 1D. The flange portion 1D is a connection surface with a filling hose not shown, and when the plug 10 and the socket 20 are connected with each other, to a plug accommodating housing 26 contacts the flange portion 1D. On the socket 20 side (left side in FIG. 1) from the flange portion 1D on an outer peripheral surface of the plug main body 1 is formed a connecting channel 1E (plug side connecting channel), and to the connecting channel 1E is fitted a connecting member 40 (connecting balls) for connecting the plug 10 and the socket 20 with each other. Here, the connecting balls 40 are arranged in a radial direction.

The plug side rod case 3 is mounted at a vertically central portion of the plug 10 and projects from the plug main body 1 toward the socket 20 side (left side in FIG. 1). The plug side rod case 3 is shaped in a form of a hollow cylinder whose socket 20 side end portion (left side portion in FIG. 1) is closed, and in an inner space of the plug side rod case 3 is accommodated the plug side rod 2. On a predetermined position of the outer periphery of the plug side rod case 3 (a position corresponding to a lower portion of a socket side rod 22) is formed an opening 3A for passage connection, and the opening 3A opens toward the socket side rod 22 (upward in FIG. 1). When the plug 10 and the socket 20 are connected with each other, the plug side rod case 3 is inserted into of an opening portion 21C of the socket 20 (the socket main body 21), and the in-plug passage 1A and an in-socket passage 21A are communicated with each other through the opening 3A.

Figure 4:
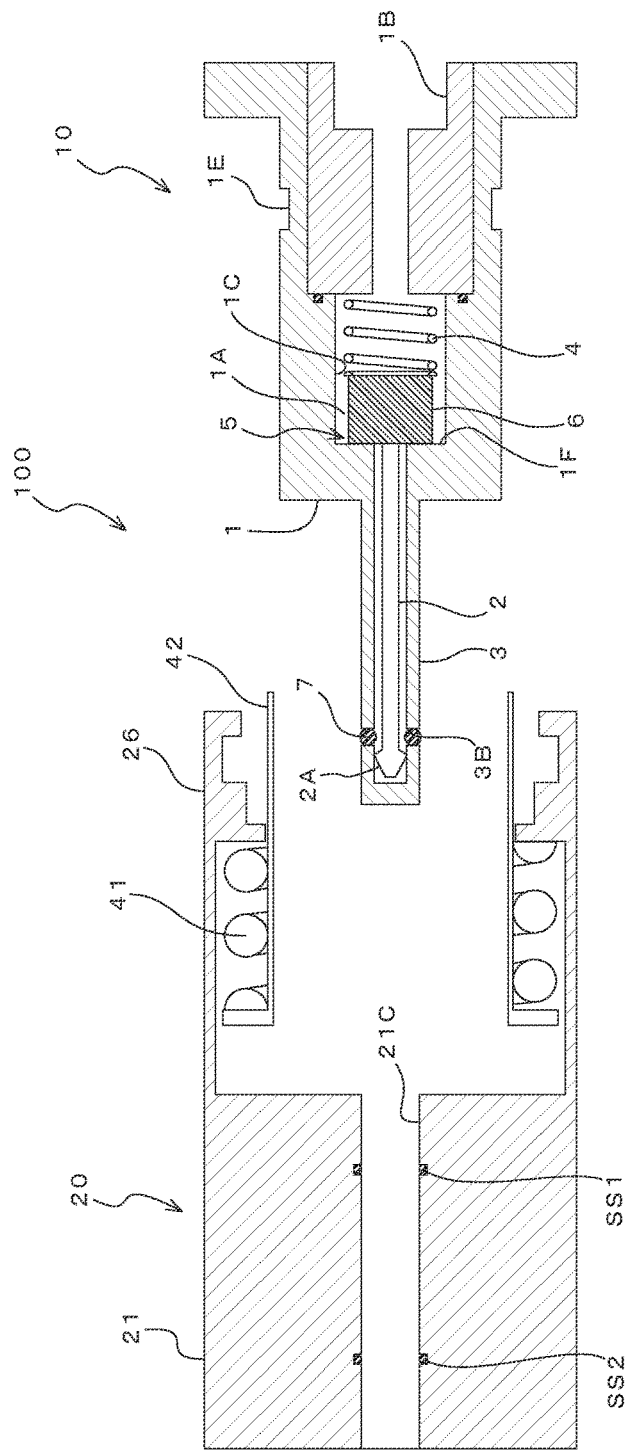
FIG. 4 is a cross sectional view taken along the B-B line in FIG. 3.
Figure 5:
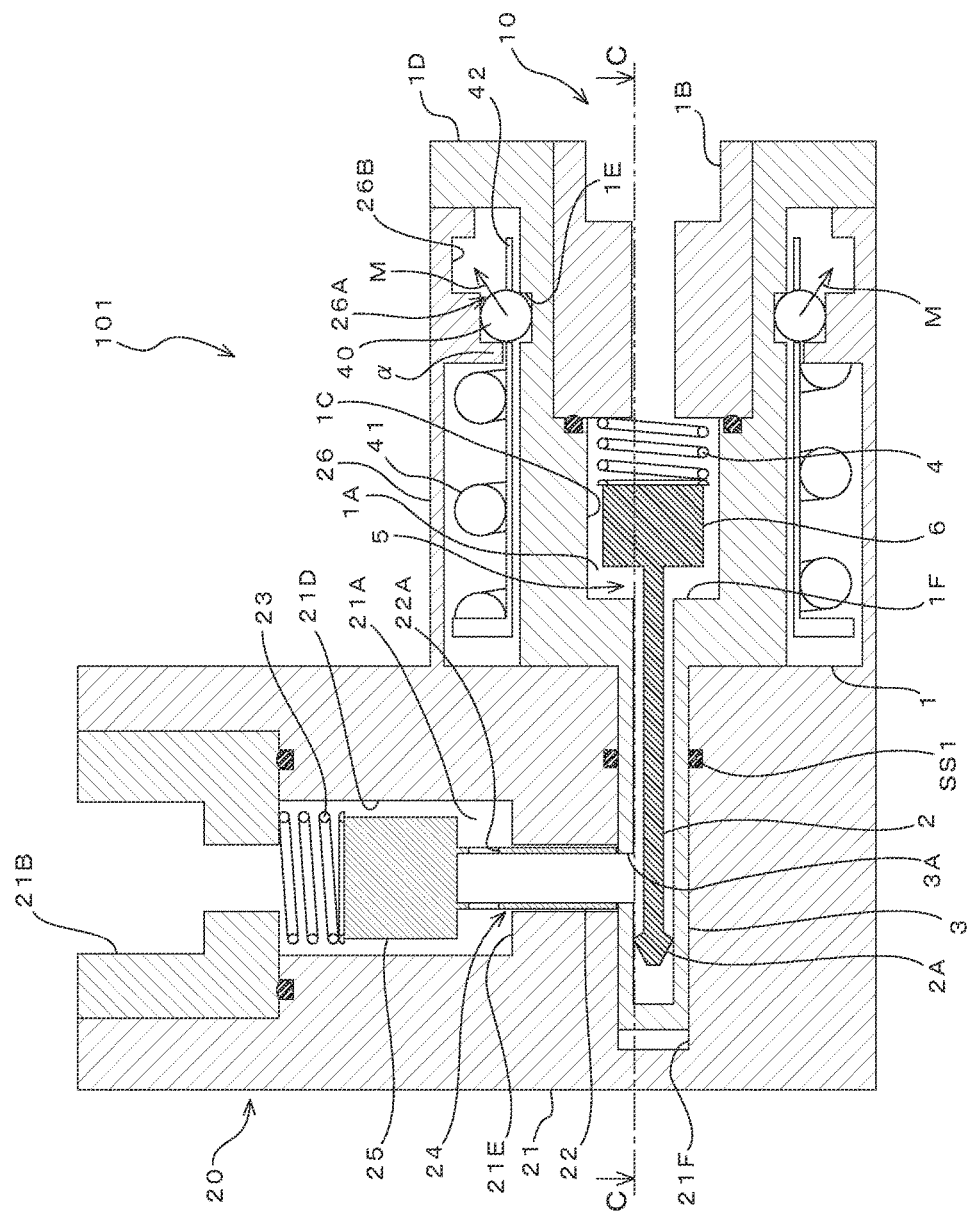
FIG. 5 is an explanatory cross sectional view showing a condition that a plug and a socket are connected with each other in the second embodiment according to the present invention.
Figure 6:
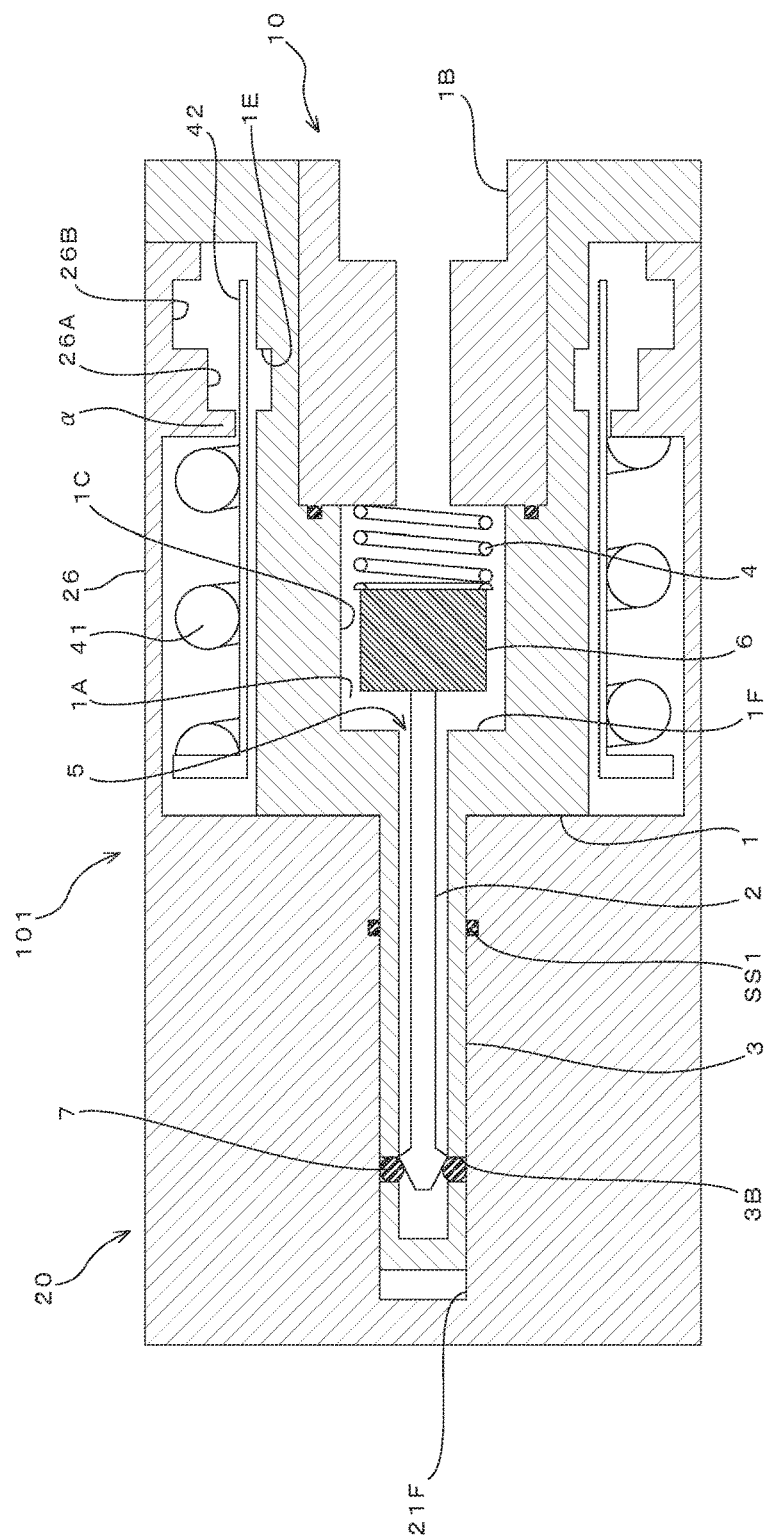
FIG. 6 is a cross sectional view taken along the C-C line in FIG. 5.
Figure 7:
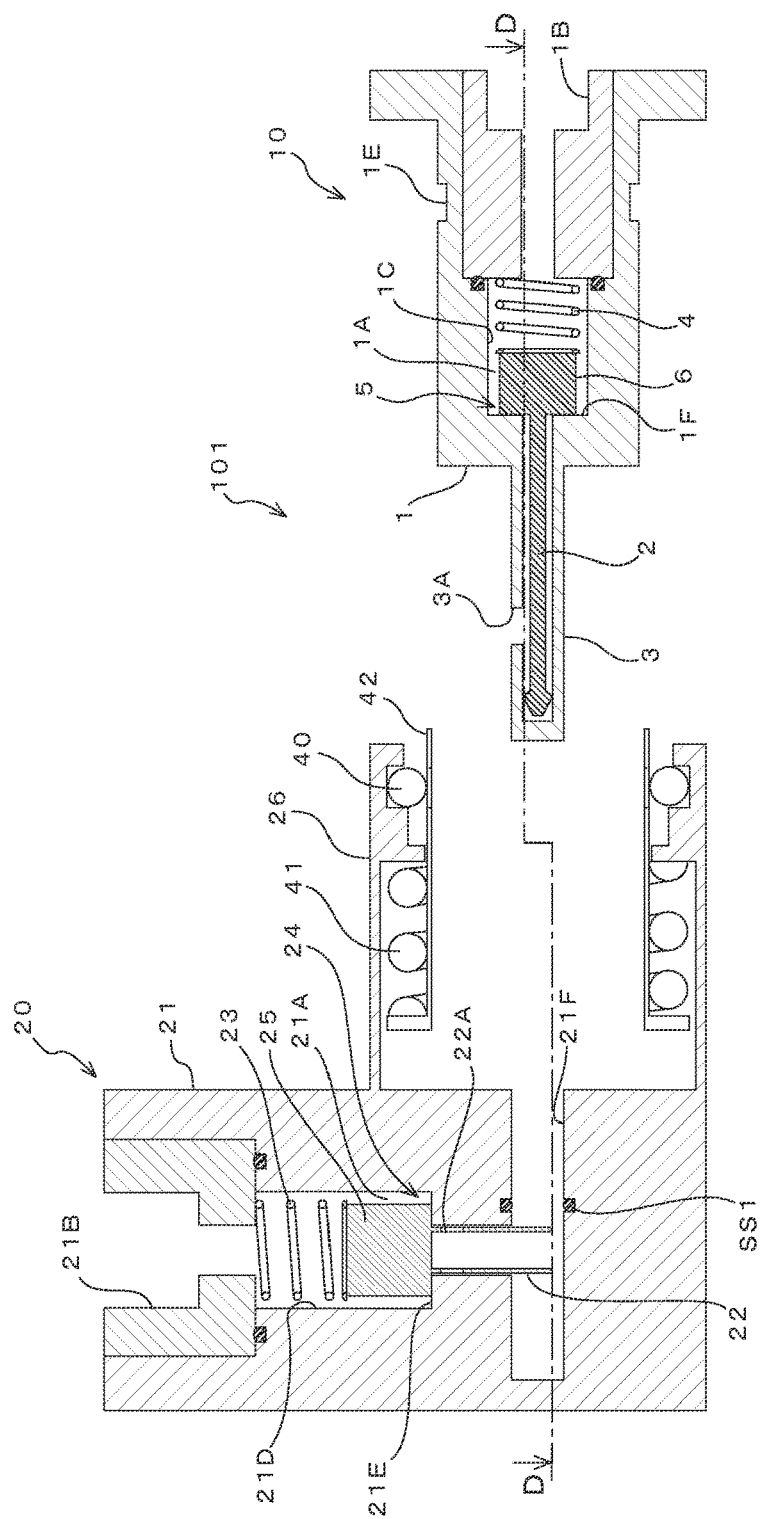
FIG. 7 is an explanatory cross sectional view showing a condition that the plug and the socket are separated from each other in the second embodiment.
Figure 8:
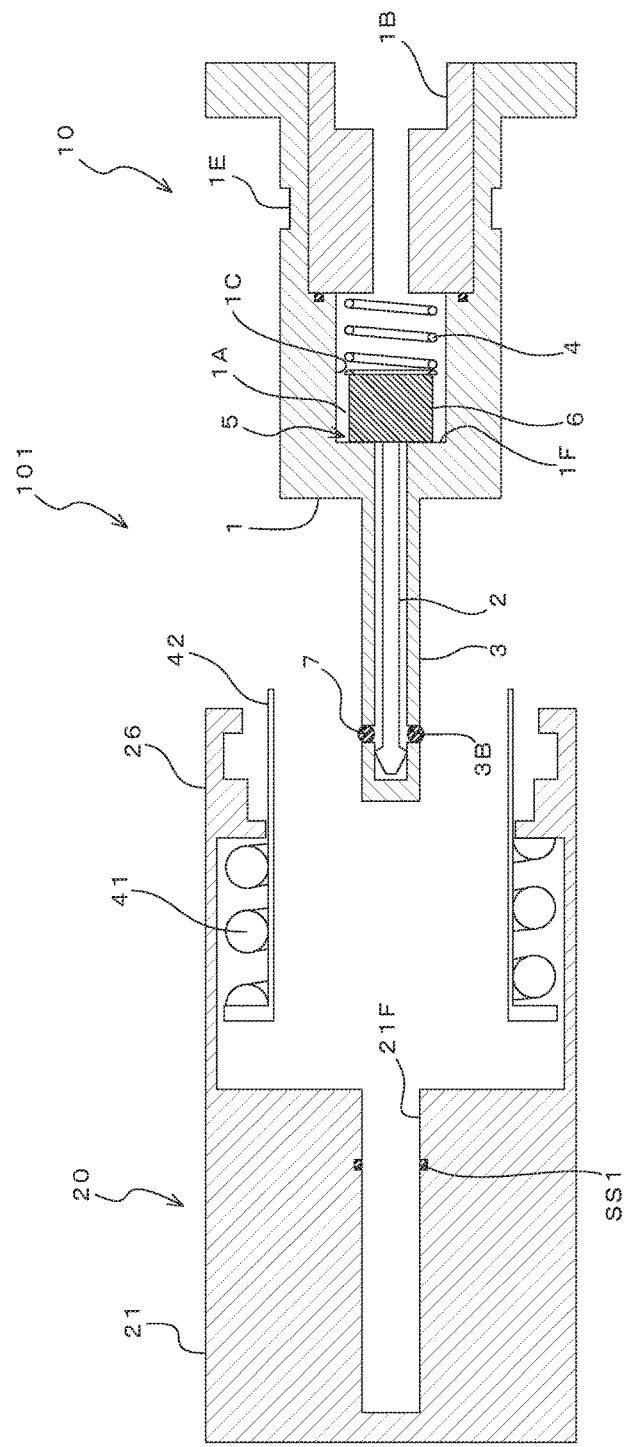
FIG. 8 is a cross sectional view taken along the D-D line in FIG. 7.

In FIG. 2, near the socket 20 side (left side in FIG. 2) end portion of the plug side rod case 3 is formed a locking ball channel 3B, and in the locking ball channel 3B are held locking balls 7. As shown in FIG. 2, by the tapered portion of the locking portion 2A of the plug side rod 2, are pressed the locking balls 7 radially outward. But, under the condition shown in FIG. 2 (condition that the plug 10 and the socket 20 are connected with each other), by an inner wall surface of the opening portion 21C of the plug 20, the locking balls 7 do not move radially outward the plug side rod case 3 from the position shown in FIG. 2. On the other hand, as shown in FIG. 4, under a condition that the plug 10 and the socket 20 are separated from each other, there is no member that prevents the locking balls 7, which are pressed radially outward the plug side rod case 3 by the tapered portion of the locking portion 2A of the plug side rod 2, from moving. Therefore, under the condition shown in FIG. 4 where the plug 10 and the socket 20 are separated from each other, the locking balls 7 position radially outward the plug side rod case 3 from the condition shown in FIG. 2 that the plug 10 and the socket 20 are connected with each other.

In FIG. 1, the socket 20 shaped like a cylinder as a whole body has the socket main body 21 and the plug accommodating housing 26. On a horizontally central portion of a hydrogen filling apparatus (not shown) side (upper side in FIG. 1) end portion of the socket main body 21 is formed a hydrogen gas introducing port 21B for introducing hydrogen gas that is fed from the hydrogen filling apparatus (not shown). On a horizontally central portion of the socket main body 21 shown in FIG. 1 is formed the in-socket passage 21A extending in the vertical direction. In the in-socket passage 21A is formed an enlarged region, which configures a socket side valve element accommodating portion 21D for accommodating a socket side valve element 25. The in-socket passage 21A communicates from the hydrogen gas introducing port 21B through the socket side valve element accommodating portion 21D and a hollow portion of the socket side rod 22, with the opening portion 21C of the socket main body 21. The opening portion 21C extends in the horizontal direction in FIG. 1, an end portion apart from the plug 10 of the opening portion 21C (left side in FIG. 1) is opened. In other words, the opening portion 21C is formed to be a through hole.

In order to connect plug 10 and the socket 20 are connected with each other, in FIG. 1, under a condition that the hydrogen gas introducing port 21B, the socket side spring 23 and the socket side rod 22 are removed, to the opening portion 21C is inserted into the plug side rod case 3, and the socket side rod 22, the socket side spring 23 and the hydrogen gas introducing port 21B are incorporated into the socket main body 21 in this order. Under a condition the plug 10 and the socket 20 are connected with each other, into the opening portion 21C is inserted the plug side rod case 3, and the in-socket passage 21A communicates through the hollow portions in the socket side rod 22 and the opening 3A of the plug side rod case 3 with the in-plug passage 1A. On an inner periphery of the opening portion 21C of the socket main body 21 are mounted O-rings SS1, SS2 (seal members) for sealing a gap between the inner peripheral surface of the opening portion 21C and the outer peripheral surface of the plug side rod case 3.

To the opening portion 21C side end portion of the socket side valve element 25 accommodated in the socket side valve element accommodating portion 21D is connected the socket side rod 22. In the socket side valve element accommodating portion 21D, in a region on the side of the hydrogen gas introducing port 21B (upper side in FIG. 1) of the socket side valve element 25 is arranged a socket side spring 23 (an elastic material), and the socket side spring 23 energize the socket side valve element 25 toward a valve seat 21E (lower side in FIG. 1). The valve seat 21E is configured by a step portion of the valve element accommodating portion 21D, and the valve element 25 and the valve seat 21E configure a socket side shutoff valve 24, which has a function of shutting/opening the socket side passage 21A.

On the side of the valve element 25 of the socket side rod 22 are formed openings 22A, and a hydrogen gas fed to the valve element accommodating portion 21D inflows through the openings 22A to the hollow portion of the socket side rod 22. In other words, the hollow portion of the socket side rod 22 configures a portion of the in-socket passage 21A. Then, as described above, as shown in FIG. 1, under a condition that the plug 10 and the socket 20 are connected with each other, a lower end (an opening end) portion of the hollow portion in the socket side rod 22 is aligned with a position of the opening 3A of the plug side rod case 3.

The plug accommodating housing 26 projects from the socket main body 21 toward the plug 10 (right side in FIG. 1). The plug accommodating housing 26 is shaped in a form of a hollow cylinder whose plug 10 side end portion (right side portion in FIG. 1) is opened. On the inner peripheral surface of the plug accommodating housing 26 are formed at-connection arrangement portions 26A and an at-disconnection accommodating channel 26B. On the at-connection arrangement portions 26A are arranged the connecting balls 40 (connecting members) when the plug 10 and the socket 20 are connected with each other. On the other hand, in the at-disconnection accommodating channel 26B are accommodated the connecting balls 40 moved from the at-connection arrangement portions 26A when from the socket 20 is disconnected the plug 10 (in an emergency). As described above, the connecting balls 40 are arranged in a radial direction of the plug 10, and the at-connection arrangement portions 26A and the at-disconnection accommodating channel 26B are formed so as to correspond to positions and the number of the connecting balls 40.

The at-disconnection accommodating channel 26B is formed on the opening end side of the plug accommodating housing 26 (right side in FIG. 1) from the at-connection arrangement portions 26A. Then, the horizontal (lateral in FIG. 1) position of the at-connection arrangement portions 26A corresponds to that of the plug side connecting channel 1E of the plug main body 1. Radial distance from the center axis of the plug 10 to the at-disconnection accommodating channel 26B is longer than that from the center axis to the at-connection arrangement portions 26A. On the side of the socket 20 (left side in FIG. 1) of the at-connection arrangement portions 26A is formed a projection α projecting from the at-connection arrangement portions 26A inwardly in a radial direction of the plug 10.

When hydrogen gas is filled, the plug 10 is inserted into the plug accommodating housing 26, and by the connecting balls 40 (connecting members) and the connecting spring 41 are integrally connected the plug 10 and the socket 20 with each other. As shown in FIG. 1, when the plug 10 and the socket 20 are connected with each other, the spring holder 42 to which the connecting spring 41 is attached positions in a gap between the inner peripheral surface of the plug accommodating housing 26 and the outer peripheral surface of the plug main body 1. The connecting balls 40 are fitted into connecting ball holes 42A formed on the spring holder 42, and engage with the plug side connecting channel 1E of the plug main body 1. At this time, on the socket 20 side of the connecting balls 40 (left side in FIG. 1) positions the projection α, and in the radially outward direction of the connecting balls 40 position the at-connection arrangement portions 26A.

The spring holder 42 engages with the plug 10 through the connecting balls 40 (connecting members) and the plug side connecting channel 1E in which the connecting balls 40 fit. Then, when the plug 10 and the socket 20 are connected with each other, the plug 10 and the socket 20 are integrated with each other so as to hold the spring holder 42 and the connecting balls 40 in between. As clearly shown in FIGS. 3 and 4, the connecting balls 40, the spring holder 42 and the connecting spring 41 attached to the spring holder 42 are formed as separate members from the plug 10 and the socket 20.

In FIG. 1, when a force pulling out the plug 10 (a force in a direction opposite to the socket 20: right side in FIG. 1) is applied, through the connecting balls 40, the spring holder 42 and the connecting spring 41 try to move in a direction apart from the socket 20 (right side in FIG. 1). When the connecting spring 41 tries to move apart from the socket 20 (right side in FIG. 1), the projection α of the plug accommodating housing 26 presses the connecting spring 41. Elastically repulsive force generated by the press acts so as to extend the connecting spring 41. The elastically repulsive force trying to extend the connecting spring 41 is applied through the connecting balls 40 and the plug side connecting channel 1E to the plug 10, and tries to move the plug 10 left in FIG. 1. In other words, the elastically repulsive force by the connecting spring 41 is applied in a direction trying to decrease the force pulling out the plug 10 (moving the plug 10 right in FIG. 1). Unless more than predetermined magnitude of force for pulling out the plug 10 is applied thereto, even if to the connecting balls 40 are applied the forces shown as the allows M in FIG. 1, the forces are weakened by the elastically repulsive force by the connecting spring 41, and a condition that connecting balls 40 are fitted into the plug side connecting channel 1E is maintained, which does not release the connection between the plug 10 and the socket 20.

Figure 3:
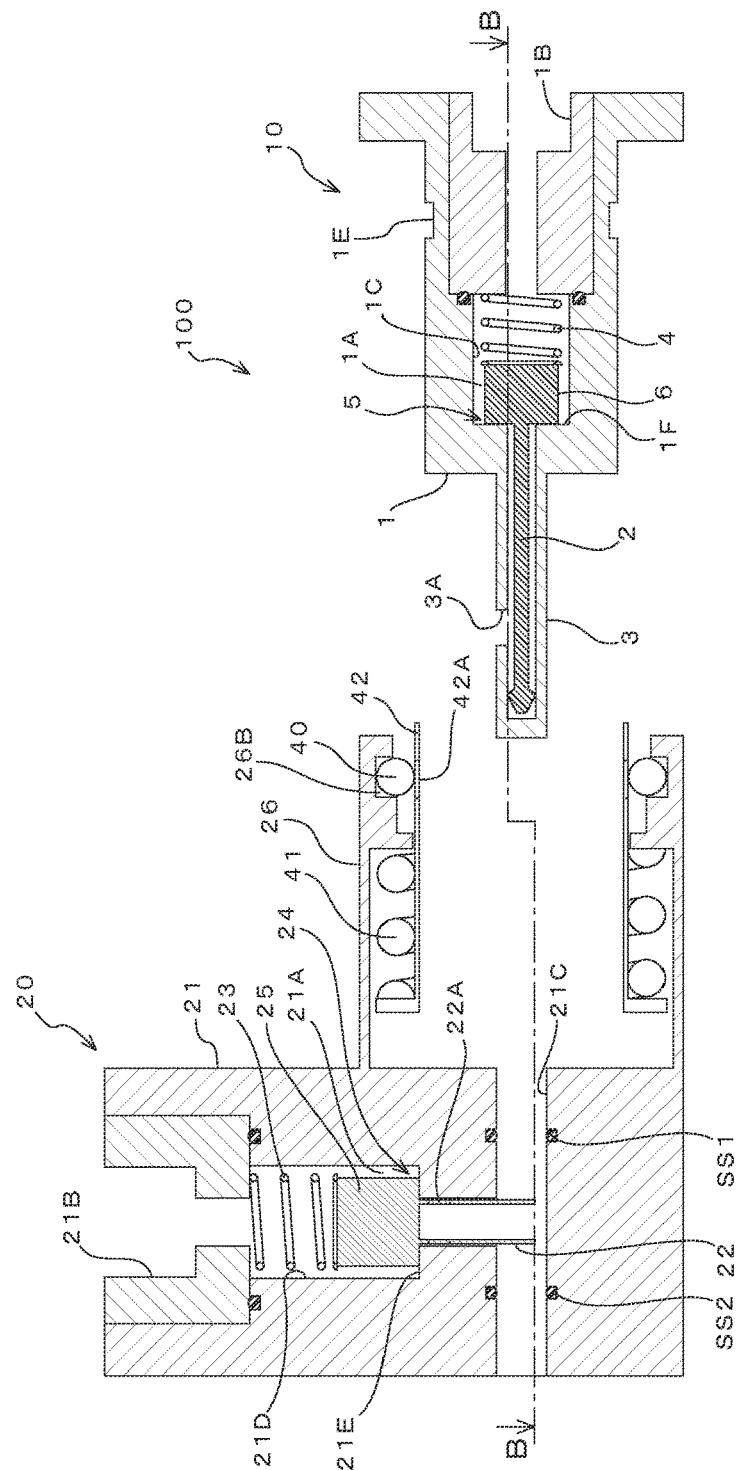
FIG. 3 is an explanatory cross sectional view showing a condition that the plug and the socket are separated from each other in the first embodiment.

On the other hand, when more than predetermined magnitude of force for pulling out the plug 10 is applied thereto, the connecting balls 40 disengaged from the plug side connecting channel 1E and move in the arrow M directions, and as show in FIG. 3, the connecting balls 40 are fitted into the at-disconnection accommodating channel 26B of the plug accommodating housing 26. Disengagement of the connecting balls 40 from the plug side connecting channel 1E allows the plug 10 to be disconnected from the socket 20 and to move on the side apart from the socket 20 (right side in FIG. 1), resulting in a disjoint condition shown in FIGS. 3 and 4. Here, the predetermined value (boundary value that the joint between the plug 10 and the socket 20 is released) is determined based on specifications of the hydrogen filling apparatus, the filling hose and the like, and based on the predetermined value are designed the plug 10, the socket 20 (plug accommodating housing 26), the connecting balls 40, the connecting spring 41 and the spring holder 42. In this connection, in order to connect the separated plug 10 and the socket 20 with each other, after plug side rod case 3 of the plug 10 is inserted into the opening portion 21C of the socket main body 21, using a jig, the spring holder 42 is moved to the condition shown in FIG. 3, and the connecting balls 40 and the spring holder 42 are moved toward the at-connection arrangement portions 26A of the plug accommodating housing 26 while the connecting balls 40 being inserted in the connecting ball holes 42A.

As shown in FIG. 1, under a condition the plug 10 and the socket 20 are connected with each other, the lower end portion of the hollow socket side rod 22 (in FIG. 1) contacts the plug side rod case 3 of the plug 10. Then, the socket side rod 22 positions, against the elastically repulsive force of the socket side spring 23, on an upper portion in FIG. 1, and the socket side valve element 25 mounted on an end of the socket side rod 22 (upper end in FIG. 1) is apart from the socket side valve seat 21E upward, and the socket side shutoff valve 24 opens.

In addition, as shown in FIG. 2, under a condition that the plug 10 and the socket 20 are connected with each other, the plug side rod case 3 is inserted into the opening portion 21C of the socket 20. Even if the locking balls 7 as locking members try to project from the locking ball channel 3B in the outwardly radial direction of the plug side rod case 3, the locking balls 7 cannot move, due to an inner wall surface of the opening portion 21C of the socket 20, from a condition shown in FIG. 2 in the outwardly radial direction (of the plug side rod case 3). When the locking balls 7 position as shown in FIG. 2, an end portion of the plug side rod 2 including the locking portion 2A whose diameter is large cannot move beyond the locking balls 7 (in FIG. 2, the end portion of the plug side rod 2 cannot move left from the locking balls 7). In FIG. 4, under a condition that the plug side valve element 6 and the plug side rod 2 are moved rightward by a jig so as to situate the locking portion 2A of the plug side rod 2 right side from the locking balls 7, when the plug side rod case 3 is inserted into the opening portion 21C of the socket 20, the locking balls 7 press the plug side rod 2 in the right direction in FIG. 2, so that the plug side rod 2 separates, against the elastically repulsive force of the plug side spring 4, the plug side valve element 6 from the plug side valve seat 1F. As a result, the plug side shutoff valve 5 opens.

When both of the socket side shutoff valve 24 (FIG. 1) in the socket 20 and the plug side shutoff valve 5 in the plug 10 become open, the in-socket passage 21A (the hydrogen gas introducing port 21B, the socket side valve element accommodating portion 21D, the hollow portion of the socket side rod 22 and the opening portion 21C of the socket 20) and the in-plug passage 1A (the hollow portion of the plug side rod case 3, the plug side valve element accommodating portion 1C) are communicated with each other, and from the side of the hydrogen filling apparatus (weighing machine) to the side of the vehicle flows hydrogen gas.

As shown in FIG. 1, the in-plug passage 1A is orthogonal to the in-socket passage 21A, that is, the passages 1A and 21A do not form a straight line. Then, center axes of the hollow socket side rod 22 and the plug side rod 2 do not form a straight line, and end portions of the socket side rod 22 and the plug side rod 2 do not contact with each other. Therefore, even when high pressure hydrogen gas is fed, forces that the socket side rod 22 and the plug side rod 2 press with each other do not generate, so that there is no possibility that the socket 20 and the plug 10 are disconnected by the force. Then, the forces that the socket side rod 22 and the plug side rod 2 press with each other do not exist, so that there is no possibility that the separated socket 20 and the plug 10 are blown up. Then, under a condition shown in FIG. 1, even if to the socket side rod 22 and the plug side rod 2 is applied high pressure hydrogen gas, a force separating the socket 20 and the plug 10 from each other is not applied thereto. For example, even if a trouble that a vehicle starts while hydrogen gas is filled occurs, whether the socket 20 and the plug 10 are disconnected or not has no relation to the hydrogen gas pressure in the passages of the plug 10 and the socket 20 at all. Under a condition shown in FIG. 1, only when to the filling hose is applied a tensile force more than a predetermined magnitude and the connecting balls 40 are disconnected from the plug side connecting channel 1E, the socket 20 and the plug 10 are disconnected from each other, so that hydrogen gas pressures in the passages do not affect it.

In FIG. 1, even if hydrogen gas flowing out of the lower end portion (opening end portion) of the hollow portion of the socket side rod 22 does not inflow from the opening 3A of the plug side rod case 3 into the plug side rod case 3 and the hydrogen gas flows in a gap between the inner wall surface of the opening portion 21C of the socket 20 and the outer peripheral surface of the plug side rod case 3, O-rings SS1, SS2 (seal members) mounted on the socket main body 21 seal the gas, so that the hydrogen gas does not leak outside the pipe joint 100. In addition, as shown in FIG. 2, under a condition that the plug 10 and the socket 20 are connected with each other, the locking ball channel 3B positions between the O-rings SS1, SS2. Even if a high pressure hydrogen gas flowing in the plug side rod case 3 flows from the locking ball channel 3B outside the plug side rod case 3, O-rings SS1, SS2 seal the gas, which prevents the high pressure hydrogen from leaking outside the pipe joint 100.

As described above, when a tensile force more than a predetermined magnitude is applied to the filling hose so as to detach the connecting balls 40 (connecting members) from the plug side connecting channel 1E due to a trouble that a vehicle starts while hydrogen gas is filled and others, the plug 10 and the socket 20 are disconnected from each other. When the plug 10 and the socket 20 are disconnected from each other, as shown in FIG. 3, the plug side rod case 3 of the plug 10 is detached from the opening portion 21C of the socket 20 (socket main body 21), and the socket side valve element 25 moves downward in FIG. 3 by an elastically repulsive force of the socket side spring 23 to seat on the socket side valve seat 21E. Then, the socket side shutoff valve 24 shuts the in-socket passage 21A.

In addition, as shown in FIG. 4, when the plug side rod case 3 of the plug 10 is detached from the opening portion 21C of the socket 20 (socket main body 21), no member for preventing the locking balls 7 from moving in an outwardly radial direction of the plug side rod case 3 from the locking ball channel 3B (a direction apart from the plug side rod 2) exists. Then, the locking balls 7 can move outwardly radially from the plug side rod case 3. When the locking balls 7 moves outwardly radially from the plug side rod case 3, the plug side rod 2 becomes capable of moving left from the locking balls 7 in FIG. 4. Then, by the elastically repulsive force of the plug side spring 4, the plug side rod 2 moves left from the locking balls 7 in FIG. 4. As a result, the plug side valve element 6 seats on the plug side valve seat 1F, and the plug side shutoff valve 5 shuts the in-plug passage 1A. When the plug 10 and the socket 20 are disconnected from each other, as described above, the socket side shutoff valve 24 and the plug side shutoff valve 5 close the in-socket passage 21A and the in-plug passage 1A respectively, so that hydrogen gas does not leak from vehicle side and weighing machine side.

In the pipe joint 100 according to the first embodiment shown in FIGS. 1 to 4, the socket side pin connecting end portion seal material 336, the plug side pin connecting end portion seal material 316, the socket side pin another end portion side seal material 338 and the plug side pin another end portion side seal material 318 of the conventional technique shown in FIGS. 10 and 11 are not required. In the pipe joint 100, it is sufficient to mount the O-rings SS1, SS2 for sealing a gap between the inner wall surface of the opening portion 21C of the socket 20 and the outer peripheral surface of the plug side rod case 3. Therefore, the number of sealing members is reduced, which simplifies the structure by that amount.

With the pipe joint 100 according to the first embodiment shown in FIGS. 1 to 4, unlike the conventional technique shown in FIGS. 10 and 11, central axes of the in-plug passage 1A and the in-socket passage 21A do not form a straight line, but the in-plug passage 1A is orthogonal to the in-socket passage 21A, so that central axes of the plug side rod 2 and the socket side rod 22 do not form a straight line. Therefore, the plug side rod 2 and the socket side rod 22 are not pressed with each other with end portions thereof. Then, even when a high pressure hydrogen gas is fed, the forces that both end portions of the plug side rod 2 and the socket side rod 22 press with each other do not increase, the socket 20 and the plug 10 are not disconnected from each other. Then, there is no possibility that the separated socket 20 and the plug 10 are blown off.

In the first embodiment, even when a high pressure hydrogen gas is fed, the forces that both end portions of the plug side rod 2 and the socket side rod 22 are pressed with each other do not increase, so that the socket side pin connecting end portion seal material 336, the plug side pin connecting end portion seal material 316, the socket side pin another end portion side seal material 338 and the plug side pin another end portion side seal material 318 that are essential in the conventional technique shown in FIGS. 10 and 11 are not required.

In the first embodiment, the plug 10 and the socket 20 are connected with each other by the connecting balls 40 arranged in a radial direction of the plug 10, so that a condition that the plug 10 and the socket 20 are connected with each other is certainly maintained. Then, in the first embodiment, since the connecting balls 40 (a mechanism including the spring holder 42 into which the connecting balls fit) are configured to disconnect the plug 10 and the socket 20 from each other when an external force more than predetermined magnitude is applied to the plug 10 and the socket 20 in the direction that they are separated from each other, regardless of pressures in the passages of the plug 10 and the socket 20, only the external force (a tensile force applied to a filling hose in case that a vehicle moves at filling, for instance) allows the plug 10 and the socket 20 to certainly be separated from each other.

In the first embodiment, on one end of the socket side valve rod 22 with a hollow shape is mounted (the valve element 25 of) the socket side shutoff valve 24 against the socket side spring 23, and when the plug 10 and the socket 20 are disconnected from each other, the socket side valve rod 22 and the plug side rod case 3 are not contacted with each other to close the socket side shutoff valve 24. As a result, it can be prevented that a gas leaks from the side to which the socket 20 is connected (basically the filling apparatus side, possibly the vehicle side). In addition, on one end of the plug side valve rod 2 is mounted the valve element 6 of the plug side shutoff valve 5 and the other end thereof is the locking portion 2A with large diameter capable of being locked to the locking balls 7 (locking members), and when the locking portion 2A is locked to the locking balls 7, the plug side shutoff valve 5 opens. When the plug 10 and the socket 20 are disconnected from each other, the locking portion 2A is not locked to the locking balls 7, and the plug side shutoff valve 5 closes. As a result, it can be prevented that a gas leaks from the side to which the plug 10 is connected (basically the vehicle side, possibly the filling apparatus side).

Next, the second embodiment of the present invention will be explained with reference to FIGS. 5 to 8. In the pipe joint 100 according to the first embodiment, in the socket 20 (socket main body 21), both end portions (an end portion opposing a plug side portion also: left side in FIG. 1) of the opening portion 21C in which the plug side rod case 3 is accommodated are opened, that is, the opening portion 21C becomes a through hole. In contrast, in the pipe joint 101 according to the second embodiment, the opening portion 21F in which the plug side rod case 3 is inserted is a blind hole, that is, the end portion on the side opposite to the side inserting the plug side rod case 3 is closed.

Therefore, at the filling, a hydrogen gas does not leak outside the pipe joint 101 (plug 10 and socket 20) through a gap between the inner peripheral surface of the opening portion 21F on the side separated from the plug 10 and the outer peripheral surface of the plug side rod case 3. Then, in the second embodiment, the O-ring SS2 that is essential in the first embodiment is unnecessary. In addition, in FIGS. 5 to 8, to members corresponding to those shown in FIGS. 1 to 4 are attached the same numerals as those in FIGS. 1 to 4, and repeated explanations are omitted. Other constructions and action effects of the second embodiment shown in FIGS. 5 to 8 are the same as those of the first embodiment that has been explained with reference to FIGS. 1 to 4.

Since the embodiments shown in the drawings are merely examples, and the embodiments do not limit the technical scope of the present invention.

DESCRIPTION OF THE REFERENCE NUMERALS

1 plug main body
1A in-plug passage
1B hydrogen gas supply port
2 plug side rod (plug side valve rod)
3 plug side rod case
4 plug side spring (elastic body)
5 plug side shutoff valve
6 valve element of plug side shutoff valve 7 locking ball (locking member)
10 plug
20 socket
21 socket main body
21A in-socket passage
21B hydrogen gas introducing port
21C opening portion (of socket main body)
22 socket side rod (socket side valve rod)
22A opening
23 socket side spring (elastic body)
24 socket side shutoff valve
25 valve element of socket side shutoff valve
26 plug housing
40 connecting member
41 connection spring
42 spring holder
100, 101 pipe joints (pipe joints for emergency releasing)
SS1, SS2 O-rings (seal members)

What is claimed is:

1. A pipe joint comprising:
    a cylindrical plug comprising:
        a plug main body in which a plug passage is formed;
        a case coupled to the plug main body; and
        a plug shutoff valve moveable within the plug main body for opening and closing the plug passage;
    a cylindrical socket comprising:
        a socket main body in which first and second socket passages are formed and are angularly offset from one another, the first socket passage being sized and structured to removeably receive the case of the cylindrical plug;
        a socket rod moveable within the second socket passage between an extended position and a retracted position, a portion of the socket rod extending within the first socket passage when the socket rod is in the extended position; and
        a socket shutoff valve connected to the socket rod and moveable relative to the socket main body for opening and closing the second socket passage;
    insertion of the case into the first socket passage causing the plug shutoff valve to move to open the plug passage, and also causing engagement between the case and the socket rod to transition the socket rod from the extended position toward the retracted position to move the socket shutoff valve to open the second socket passage;
    removal of the case from the first socket passage causing the plug shutoff valve to move to close the plug passage, and also causing the case to disengage the socket rod to transition the socket rod from the retracted position toward the extended position to move the socket shutoff valve to close the second socket passage.

2. The pipe joint as claimed in claim 1, wherein the plug and the socket are connected with each other by connecting members arranged in a radial direction of the plug.

3. The pipe joint as claimed in claim 2, wherein the connecting members release connection between the plug and the socket when an external force more than predetermined value is applied to plug and the socket in a direction that the plug and the socket are separated from each other.

4. The pipe joint as claimed in claim 1, further comprising an elastic body mounted against the socket side shutoff valve.

5. The pipe joint as claimed in claim 1, further comprising a plug side valve rod mounted on one end to the plug shutoff valve against an elastic body, and another end is locked by at least one locking member to open the plug side shutoff valve.

6. The pipe joint as claimed in claim 2, further comprising an elastic body mounted against the socket side shutoff valve.

7. The pipe joint as claimed in claim 3, further comprising an elastic body mounted against the socket side shutoff valve.

8. The pipe joint as claimed in claim 2, further comprising a plug side valve rod mounted on one end to the plug shutoff valve against an elastic body, and another end is locked by at least one locking member to open the plug side shutoff valve.

9. The pipe joint as claimed in claim 3, further comprising a plug side valve rod is mounted on one end to the plug shutoff valve against an elastic body, and another end is locked by at least one locking member to open the plug side shutoff valve.

10. The pipe joint as claimed in claim 4, further comprising a plug side valve rod mounted on one end to the plug shutoff valve against an elastic body, and another end is locked by at least one locking member to open the plug side shutoff valve.

11. The pipe joint as claimed in claim 1, further comprising a plug rod coupled to the plug shutoff valve and moveable within a hollow interior of the case.

12. The pipe joint as claimed in claim 11, wherein the case includes a channel formed therein and in communication within the hollow interior, the pipe joint further comprising a locking ball disposed within the channel and engageable with the socket main body when the case is inserted into the first socket passage.

13. The pipe joint as claimed in claim 12, wherein the plug rod includes an enlarged end portion enagageable with the locking ball.

14. The pipe joint as claimed in claim 13, wherein the locking ball and socket main body are configured such that insertion of the case into the first socket passage causes the locking ball to move into the case and interface with the enlarged end portion of the plug rod to move the plug rod relative to the case.

15. The pipe joint as claimed in claim 1, wherein the cylindrical socket includes a plug accommodating housing coupled to the socket main body, the plug accommodating housing being configured to receive at least a portion of the cylindrical plug.

16. The pipe joint as claimed in claim 15, further comprising a coil spring and a spring holder, both of which are positioned within the plug accommodating housing, at least a portion of the cylindrical plug being insertable within the coil spring and the spring holder.

17. The pipe joint as claimed in claim 16, wherein the spring holder includes a hole, the pipe joint further comprising a connecting ball received within the hole and engageable with the cylindrical plug and the cylindrical socket.

* * * * *